(12) United States Patent
Bradski

(10) Patent No.: US 11,734,827 B2
(45) Date of Patent: *Aug. 22, 2023

(54) USER GUIDED ITERATIVE FRAME AND SCENE SEGMENTATION VIA NETWORK OVERTRAINING

(71) Applicant: Matterport, Inc., Sunnyvale, CA (US)

(72) Inventor: Gary Bradski, Palo Alto, CA (US)

(73) Assignee: Matterport, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,755

(22) Filed: May 11, 2021

(65) Prior Publication Data

US 2021/0264609 A1 Aug. 26, 2021

Related U.S. Application Data

(63) Continuation of application No. 16/411,739, filed on May 14, 2019, now Pat. No. 11,004,203.

(51) Int. Cl.
| | | |
|---|---|---|
| *G06T 7/11* | (2017.01) | |
| *G06T 11/20* | (2006.01) | |
| *G06T 7/187* | (2017.01) | |
| *G06N 3/08* | (2023.01) | |
| *G06F 3/0488* | (2022.01) | |
| *G06F 3/04883* | (2022.01) | |

(52) U.S. Cl.
CPC ........... *G06T 7/11* (2017.01); *G06F 3/04883* (2013.01); *G06N 3/08* (2013.01); *G06T 7/187* (2017.01); *G06T 11/203* (2013.01)

(58) Field of Classification Search
CPC ......... G06T 7/11; G06T 7/187; G06T 11/203; G06F 3/04883; G06N 3/08
See application file for complete search history.

(56) References Cited

U.S. PATENT DOCUMENTS

| | | |
|---|---|---|
| 8,175,384 B1 | 5/2012 | Wang |
| 8,386,964 B2 | 2/2013 | Sun et al. |
| 8,452,087 B2 | 5/2013 | Sun et al. |
| 8,548,251 B2 | 10/2013 | Pettigrew et al. |

(Continued)

FOREIGN PATENT DOCUMENTS

WO 2006092542 A1 9/2006

OTHER PUBLICATIONS

A. Bearman, et al., What's the Point: Semantic Segmentation with Point Supervision, arXiv:1506.02106v5, Jul. 23, 2016, 16 pages.

(Continued)

*Primary Examiner* — David F Dunphy
(74) *Attorney, Agent, or Firm* — Ahmann Kloke LLP

(57) ABSTRACT

Systems and methods for user guided iterative frame and scene segmentation are disclosed herein. The systems and methods can rely on overtraining a segmentation network on a frame. A disclosed method includes selecting a frame from a scene and generating a frame segmentation using the frame and a segmentation network. The method also includes displaying the frame and frame segmentation overlain on the frame, receiving a correction input on the frame, and training the segmentation network using the correction input. The method includes overtraining the segmentation network for the scene by iterating the above steps on the same frame or a series of frames from the scene.

22 Claims, 6 Drawing Sheets

(56) References Cited

U.S. PATENT DOCUMENTS

| | | | |
|---|---|---|---|
| 8,670,615 | B2 | 3/2014 | Piramuthu et al. |
| 9,773,196 | B2 | 9/2017 | Sachs et al. |
| 2015/0170005 | A1 | 6/2015 | Cohen et al. |
| 2016/0062615 | A1 | 3/2016 | Price et al. |
| 2017/0039723 | A1 | 2/2017 | Price et al. |
| 2019/0180097 | A1 | 6/2019 | Ferguson et al. |
| 2019/0332893 | A1 | 10/2019 | Roy et al. |
| 2019/0347547 | A1 | 11/2019 | Ebstyne et al. |
| 2020/0143171 | A1* | 5/2020 | Lee .................. G06V 10/764 |

OTHER PUBLICATIONS

C. Rother, et al., GrabCut—Interactive Foreground Extraction using Iterated Graph Cuts, Microsoft Research, ACM Transactions on Graphics, Aug. 2004, 6 pages.

G. Bredell, et al., Iterative Interaction Training for Segmentation Editing Networks, arXiv: 1807.05888v1, Jul. 23, 2018, 8 pages.

K. Maninis, et al., Video Object Segmentation Without Temporal Information, arXiv:1709.06031v2, May 16, 2018, 15 pages.

Non-Final Office Action for U.S. Appl. No. 16/411,739 dated Sep. 14, 2020, 7 pages.

Notice of Allowance for U.S. Appl. No. 16/411,739 dated Jan. 13, 2021, 8 pages.

S. Dutt Jain, et al., Click Carving: Segmenting Objects in Video with Point Clicks, Proc. 4th Conf. Human Comp. and Crowdsourcing, 2016, 10 pages.

V. Badrinarayanan, et al., SegNet: A Deep Convolutional Encoder-Decoder Architecture for Robust Semantic Pixel- Wise Labelling, CVPR' 15, 1468, Nov. 14, 2014, 10 pages.

Veeraraghavan et al., "Active Learning Guided Interactions for Consistent Image Segmentation With Reduced User Interactions," 2011, IEEE International Symposium on Biomedical Imaging: From Nano to Macro, pp. 1645-1648 (4 pages) (Year: 2011).

Y. Boykov, et al., Interactive Graph Cuts for Optimal Boundary & Region Segmentation of Objects in N-D Images, Proc. Int. Conf. on Computer Vision, vol. I, p. 105, Vancouver, Canada, Jul. 2001, 8 pages.

* cited by examiner

USER GUIDED ITERATIVE FRAME AND SCENE SEGMENTATION VIA NETWORK OVERTRAINING

CROSS-REFERENCE TO RELATED APPLICATIONS

This application is a continuation of U.S. patent application Ser. No. 16/411,739, filed on May 14, 2019 and entitled "USER GUIDED ITERATIVE FRAME AND SCENE SEGMENTATION VIA NETWORK OVERTRAINING," which is incorporated herein by reference in its entirety.

BACKGROUND

Segmentation involves selecting a portion of an image to the exclusion of the remainder. Image editing tools generally include features such as click and drag selection boxes, free hand "lasso" selectors, and adjustable cropping boxes to allow for the manual segmentation of an image. Certain image editors also include automated segmentation features such as "magic wands" which automate selection of regions based on a selected sample using an analysis of texture information in the image, and "intelligent scissors" which conduct the same action but on the bases of edge contrast information in the image. Magic wands and intelligent scissor tools have a long history of integration with image editing tools and have been available in consumer-grade image editing software dating back to at least 1990. More recent developments in segmentation tools include those using an evaluation of energy distributions of the image such as the "Graph Cut" approach disclosed in Y. Boykov et al., *Interactive Graph Cuts for Optimal Boundary & Region Segmentation of Objects in N-D Images*, Proceedings of ICCV, vol. I, p. 105, Vancouver, Canada, July 2001.

In certain applications, the segmentation is semantic in that a portion of an image associated with a given meaning is segmented to the exclusion of other portions. One example of a semantic segmentation problem is segmenting the foreground of an image from the background where pixels associated with the foreground are segmented from pixels associated with the background. However, segmentation targets can include more specific targets than what is traditionally considered the foreground of an image and can include specific subjects in the image such as an individual actor, an article of clothing, a hand, or any other portion of the image with a defined semantic association. In general, the portion of the image which is not part of the subject can be referred to as the "background" in this disclosure as the background is defined with reference to the segmentation of the image as opposed to the vantage point of the image.

Segmenting can involve generating a hard mask, which labels each pixel using a one or a zero to indicate if it is part of the foreground or background, or generating an alpha mask which labels each pixel using a value from zero to one which allows for portions of the background to appear through a foreground pixel if the foreground is moved to a different background. The "segmentation" of the image can refer to the geometric arrangement of these masks relative to the image and can be represented by the mask values mentioned above or the values of the original image.

Recent development in image segmentation has been driven by the need to extract information from images available to machine intelligence algorithms studying images on the Internet and for facilitating autonomous vehicle awareness. The most common tool used for this kind of image analysis is a convolutional neural network (CNN). A CNN is a specific example an artificial neural networks (ANNs). CNNs involve the convolution of an input image with a set of filters that are "slid around" the image data to test for a reaction from a given filter. The filters serve in place of the variable weights in the layers of a traditional ANN. A segmentation tool that utilizes this type of trained network architecture is described in V. Badrinarayanan, et al., *SegNet: A Deep Convolutional Encoder-Decoder Architecture for Robust Semantic Pixel-Wise Labelling*, CVPR' 15, 1468, Nov. 14, 2014.

The networks mentioned above can be trained via supervised learning in which a large amount of training data entries, each of which includes a ground truth solution to a segmentation problem along with corresponding image data, are fed into the network until the network is ultimately able to execute analogous segmentation problems using only raw image data. The training process involves iteratively adjusting the weights of the network (e.g., filter values in the case of CNNs). The result is a trained network capable of identifying a specific target such as "cats" or "pedestrian" in any image provided as an input to the network.

SUMMARY

This disclosure is directed to user guided iterative frame segmentation. The frame can be a single image from a scene comprising a series of frames. In specific embodiments of the invention, the frame can be segmented using a segmentation network. The networks can be directed graph function approximators with adjustable internal variables that affect the output generated from a given input. The networks can be deep nets. The adjustable internal variables can be adjusted using back-propagation and a supervised learning training routine. The networks can be artificial neural networks (ANNs) such as convolutional neural networks (CNNs).

FIG. 1 illustrates a set of two frames from a scene 100 in which a subject 111 changes position from the first frame 110 to the second frame 120. As illustrated, the subject is segmented by a mask 112 in frame 110. Furthermore, the subject has a semantic association and is dynamic in that it changes position through the scene 100. In accordance with specific embodiments of the invention disclosed herein, a user guided iterative frame segmentation method can be applied to generate mask 112 using a segmentation network, without reference to the fact that frame 110 was selected from a scene 100. These embodiments provide for an improved methodology for segmenting images whether they are static images or part of a moving scene. However, specific embodiments of the invention disclosed herein are beneficially applied to situations in which the statistical variation of the frames in a scene is less than an overtraining exclusion threshold. As such, even if a segmentation network is over trained on frame 110, it will still accurately generate mask 121 when applied to frame 120.

In specific embodiments of the invention, a user guided iterative frame segmentation results in overtraining the network on a specific frame. As used in this disclosure, overtraining refers to a known, and usually undesirable, occurrence in which a trainable directed graph has been trained so much on a given set of test data that it will no longer function as desired when applied to a generalized set of raw data. However, specific embodiments of the user guided iterative frame segmentations disclosed herein are not in accordance with standard methodologies in this regard, and overtraining provides a benefit as opposed to a drawback. In specific approaches disclosed herein, a user who is guiding the overtraining of a network to segment a frame is effectively utilizing traditional methods for converging a function approximator to match a given function to instead solve for a specific point on that function. In short, overtraining is not an issue because the network is not meant to be generalized. After it has segmented the frame, the job is done. At the same time, the specific application of segmenting a scene provides an appealing opportunity for a network that is over trained on a given frame. Due to the likelihood of a low statistical variation between the frames in a scene, a network that would traditionally be considered over trained on a frame can still, if trained using the approaches disclosed herein, function to accurately segment a majority of the frames in a scene. In particular, sets (such as a broadcast studio) and fixed locales (such as sports fields or race tracks) present an opportunity for an over trained network on a particular frame to still function appropriately across a scene. Also, any scene where the shot stays the same while objects within the scene move presents a similar opportunity for an over trained network to function appropriately across the scene. In the same light, a network that would traditionally be considered to have been over trained on a given scene can still function as a customized network for segmenting additional scenes that are captured in front of the same background. Accordingly, the approaches disclosed herein can be used to effectively change and arbitrary background or entire set into the equivalent of a "green screen" for facilitating segmentation. and post processing on scenes captured in front of that background or in that set.

An iterative frame segmentation can involve: generating a segmentation for a frame using a directed graph, displaying the segmentation to a user, receiving a correction input from the user, training the directed graph using the correction input, and generating a revised segmentation for the frame using the directed graph. In each iteration of the process, the directed graph will be targeted more directly to the selected frame and will be less generalizable to other data sets. However, using the approaches disclosed herein, the network can still be used to segment additional frames from the scene and eliminate the large amount of manual work that is generally applied to rotoscoping the many frames that make up a scene.

Furthermore, specific approaches for providing a correction input for a segmentation are disclosed herein. The disclosure describes how these correction inputs can be used to train the segmentation network for another iteration. However, the same methods and systems used for providing a correction input can also be used to fine tune or edit a segmentation without using the correction input for training purposes.

Furthermore, specific approaches for training a segmentation network using the correction inputs are disclosed herein. However, numerous other approaches are disclosed in the following US Patent Applications which have been filed on even date herewith U.S. patent application Ser. No. 16/412,079, U.S. patent application Ser. No. 16/411,657, and U.S. patent application Ser. No. 16/412,183 which have been filed concurrently herewith and are incorporated by reference herein in their entirety for all purposes.

In specific embodiments of the invention, a computer implemented method is provided. The method comprises selecting a frame from a scene, generating a first frame segmentation using the frame and the segmentation network, displaying the frame on a device with the first frame segmentation overlaid on the frame, receiving a correction input directed to the frame, and training the segmentation network using the correction input. In a specific embodiment of the invention the method also comprises overtraining the segmentation network for the scene by iterating the selecting, generating, displaying, receiving, and training steps using one of: the same frame; or a series of frames from the scene. In another specific embodiment of the invention the method also alternatively comprises, generating, after training the segmentation network using the correction input, a revised frame segmentation using the frame and the segmentation network, and displaying on the device the frame, and the revised frame segmentation overlaid on the frame.

In specific embodiments of the invention a device is provided. The device includes a display, a frame selector instantiated on the device that is programmed to select a frame from a scene, a segmentation editor instantiated on the device that is programmed to, in response to the frame selector selecting the frame, display on the display the frame and a frame segmentation overlaid on the frame. The device also includes a correction interface that is configured to receive a correction input directed to the frame. The device is programmed to: provide the correction input to a trainer for a segmentation network, receive a revised frame segmentation from the segmentation network after the trainer has applied the correction input to the segmentation network, and display the revised frame segmentation overlaid on the frame.

DETAILED DESCRIPTION

Specific methods and systems associated with user-guided segmentations in accordance with the summary above are provided in this section. The methods and systems disclosed in this section are nonlimiting embodiments of the invention, are provided for explanatory purposes only, and should not be used to constrict the full scope of the invention.

Figure 2:
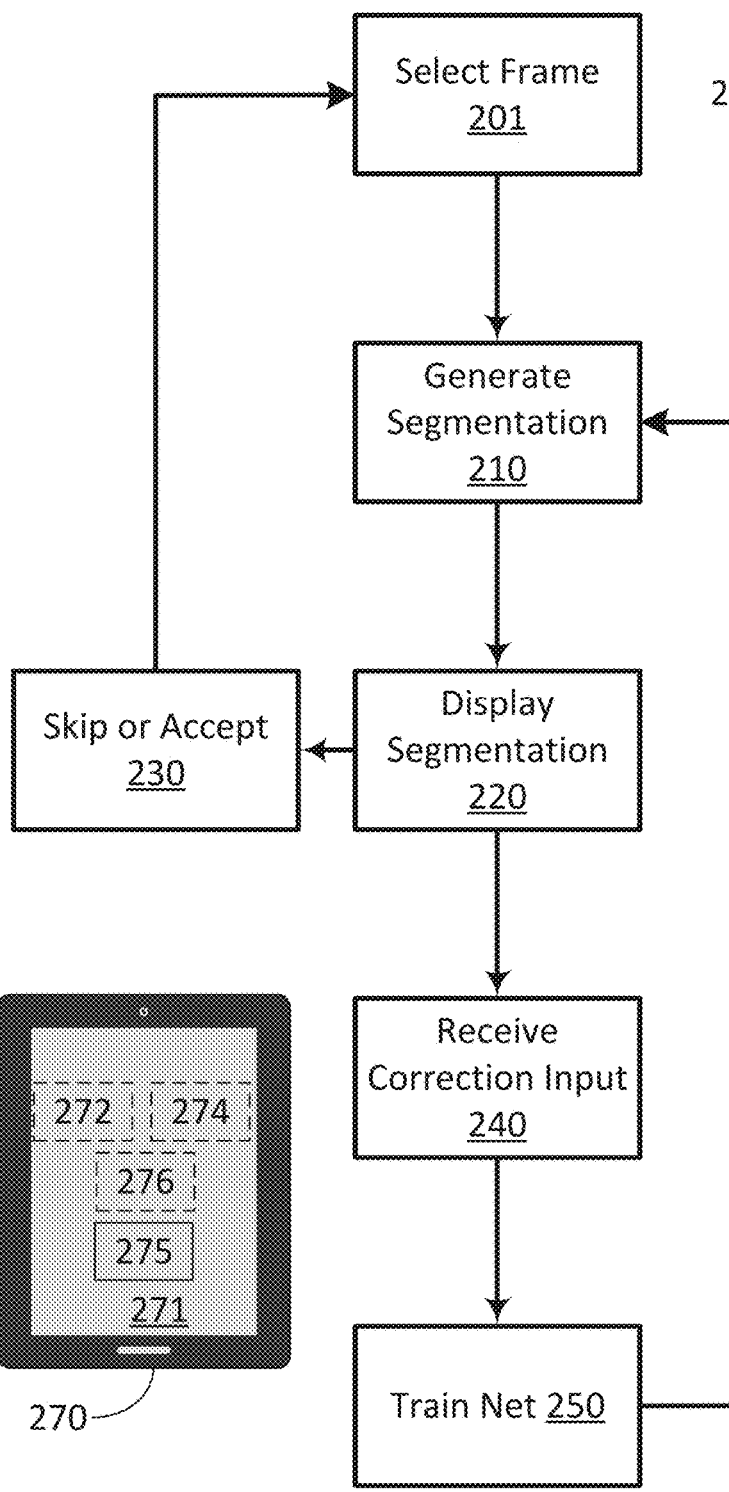
FIG. 2 is a flow chart for a set of methods and systems for conducting a segmentation of an image using a user guided segmentation network in accordance with specific embodiments of the invention disclosed herein.
Figure 2:
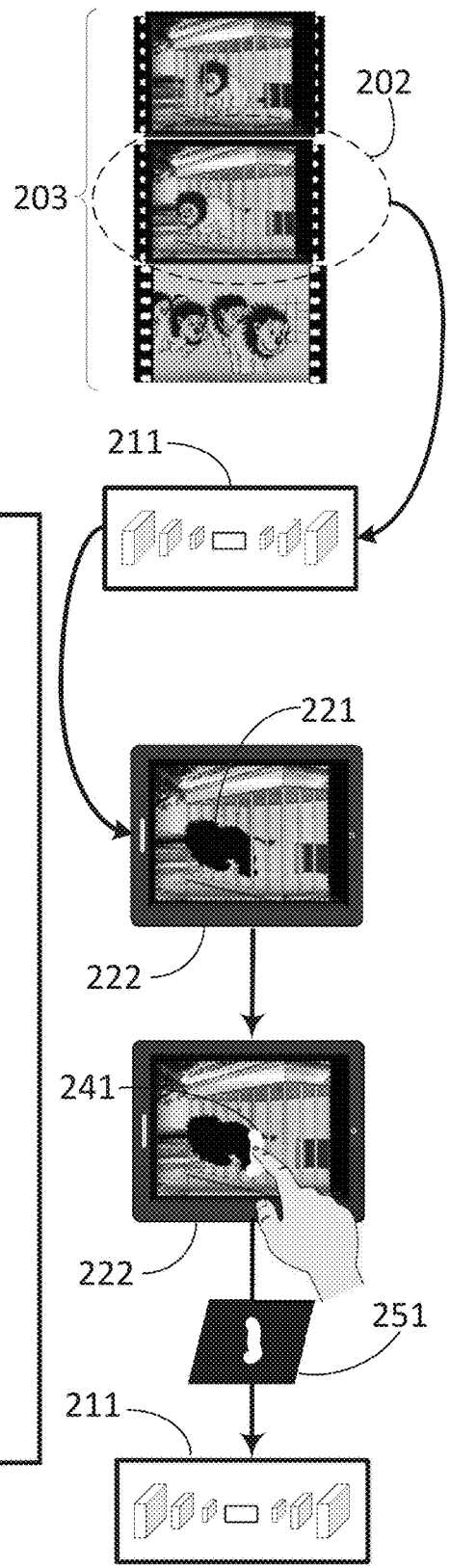
Figure 2:
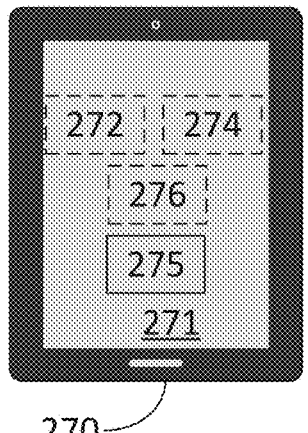

This section includes a description of specific embodiments of the invention in which a segmentation network is iteratively trained by a user guided process to segment a frame. FIG. 2 provides a flow chart 200 for a set of methods in which a network is iteratively trained by a user guided process to segment a frame which can be referenced to describe features of these embodiments. FIGS. 3-6 provide more detail regarding the individual steps in flow chart 200.

Flow chart 200 begins with a step 201 of selecting a frame. This step can involve loading a frame into a segmentation editor. In specific embodiments of the invention, the frame 202 can be selected from a scene 203. Frame 202 can be selected either manually or automatically. In specific embodiments of the invention, the frames can be selected manually by a user using a frame selector as they review the scene. Examples in accordance with these embodiments are discussed below with reference to FIG. 3. In specific embodiments of the invention, the frames can be selected automatically by an automatic frame selector upon review of the scene. Examples in accordance with these embodiments are discussed below with reference to FIG. 4.

Both the manual and automatic approaches for executing step 201 can include a review of the scene. The process can involve a search for scene breaks in the scene and the selection of representative frames for each portion of the scene. For example, a user can scan the scene to identify a collection of frames which are broadly representative of the scene and select a single frame which is representative of a subset of the frames. As another example, an automatic frame selector can conduct a mathematical analysis of the frames, such as by evaluating pixel values of a pixelated frame, identify a collection of high statistical variation points, and select frames on either side of the variation points. In either the manual or automatic scan, the high statistical variation points can be referred to as scene breaks and the subset of frames can be portions of the scene bracketed by these breaks. The tolerance for statistical variation across a subset of frames can be adjusted based on the length of the scene in order to keep the amount of effort required per scene to a tolerable level, or the amount of overtraining that will occur on a given frame from that subset. Combinations of the two approaches are also possible, where an automated frame selector identifies potential frames for review and a user can select a frame from those potential frames.

Both the manual and automatic approaches for executing step 201 can include a review of an initial segmentation which is conducted before step 201 is executed. The process can involve a search for frames with a high degree of segmentation failure such that providing training data will not require a refined input, as the errors are large areas which can be targeted easily by a user. This criteria for selecting frames is also beneficial because frames with large segmentation areas indicate frames where the network has the most to learn. The initial segmentation can involve an entire scene being segmented using the coarse application of an untrained network, and the segmentation can be overlaid on the scene as the user reviews it in order to assist the user in selecting the most poorly segmented frames. As another example, the scene can be segmented using the same coarse application of an untrained network, and a generalized non-trainable segmentation system, such as one using fixed rules regarding texture or edge variations, can be used to generate a baseline segmentation for comparison. An automated frame selector can then compare the baseline segmentation and the segmentation generated by the untrained network to identify frames in with the largest delta between the two. The frames with the largest delta can then either be automatically selected as the frames in a fully automatic execution of step 201 or be presented to the user for review and selection in a manual execution of step 201.

Flow chart 200 continues with a step 210 of generating a segmentation of the frame selected in step 201. The segmentation generated for the frame in step 210 can be referred to as a frame segmentation. The execution of step 210 presupposes that a subject for segmentation is known to the system. The subject can be selected by a user prior to the execution of step 210 or be conducted automatically via design of the system. For example, a user could provide a coarse selection input such as a tap, click, or bounding box highlighting a subject in the frame to queue up the execution of step 210. As another example, the network could be designed to segment a foreground generally and decide as to what is the foreground and what is the background of any arbitrary image, such that there is no need for the user to provide this information. The design of the system can, in the same way, be set to segment any subject automatically such as an April Tag, human actor, or any other subject.

Step 210 can involve the use of a segmentation network and a frame. The segmentation network can be an ANN such as the illustrated CNN encoder/decoder 211. The frame can be a frame selected from a scene 203 such as frame 202. The segmentation can take in the frame as an input and output the segmentation. The segmentation network can be a multipart network and can have different portions that are independently trained. The segmentation network can include a network that identifies features or subjects in the image and another network that classifies the features or subjects. The segmentation can also include another network that automatically labels each primitive element of the frame (e.g., a pixel) with a value which is representative of the findings of the classifier network. The segmentation network can be any trainable directed graph. The segmentation network can be or include any deep net, can be or include a recursive neural network (RNN), can be or include a CNN, can be or include any ANN, and can be or include any other kind of trainable directed graph or function approximator.

Figure 1:
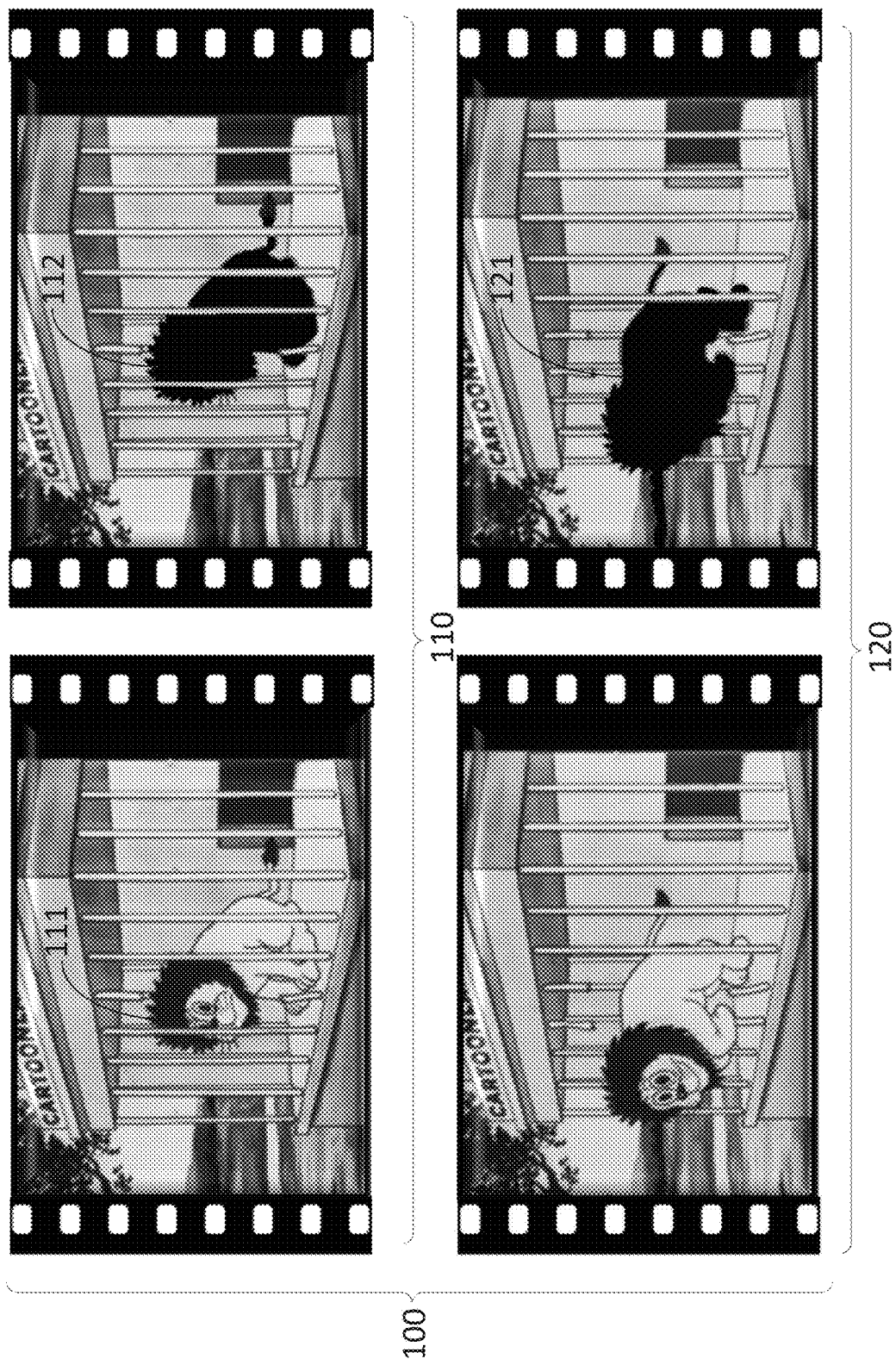
FIG. 1 is an illustration of the semantic segmentation of a subject across two frames selected from a scene in accordance with specific embodiments of the invention disclosed herein.

As used herein, outputting a segmentation or outputting a segmented image is meant to include producing any output that can be useful for a person that wants to select only a portion of an image to the exclusion of the remainder. For example, the output could be a hard mask or an alpha mask of the input. As another example, the output could be a set of original image values for the image in the segmented region with all other image values set to a fixed value, or any combination thereof. Returning to the example of FIG. 1, a segmentation network could have alternatively produced an output in which the value of all the pixels in frame 110 that were associated with subject 111 were those of the original image while the background pixel values were set to a fixed value such as zero. The fixed value could be a one, a zero, or any value indicative of a transparent pixel such as those used to render transparency in an image file. Although the example of segmenting a subject from a background will be mentioned throughout this disclosure, the approaches disclosed herein are applicable to numerous segmentation and image editing tasks and should not be limited to that application.

Flow chart 200 continues with a step 220 of displaying the segmentation. The segmentation can be displayed to a user on a display. The step of displaying the segmentation can involve displaying the entire segmentation or a portion thereof. The segmentation can be displayed overlaid on the frame so that the user can visually inspect the segmentation to identify potential corrections and refinements that need to be made. The segmentation can be displayed using a segmentation editor which allows the user to zoom in and out, translate, rotate, and otherwise manipulate the display of the segmentation and frame. The editor can allow the user to remove the overlaid segmentation, change the characteristics of the segmentation (e.g., alpha mask, hard mask, original image values) alter a transparency level of the overlaid segmentation, remove the background, and otherwise manipulate the relative display of the segmentation and frame.

As illustrated, segmentation 221 is a hard mask overlaid on frame 203 displayed on a device 222. The device can exhibit many forms but will generally include a display and an interface for receiving correction inputs. The device can be a tablet or other portable computing device available to a director that is capturing a scene on set. The device can be a workstation computer operated by a post-production specialist working on a scene that was generated at a different time and place. As illustrated, device 222 is a tablet with a touch display interface. The tools used to facilitate the display and manipulation of the frame and segmentation can be those known in the art for similar devices such as a pinch-to-zoom touch screen interface for the tablet and equivalents, and a rolling scroll-to-zoom mouse interface for a workstation. The device can also include force touch capabilities and other user input interface technology. The device can also include the ability to receive inputs from a digital pen or other hardware interface technologies.

Step 220 can involve an automated process in which portions of the segmentation are identified by the segmentation editor and displayed to the user. For example, the segmentation editor could focus a user on the boundary of the segmentation. In situations where the frame comprised primitive elements such as pixels, the focused area could be the boundary of the segmentation plus and minus a fixed number of pixels. The segmentation editor could display the segmentation in pieces as the border was traversed to allow the user to review the segmentation. The transition along the border could involve a smooth scroll along the path, or paths, of the boarder, or a sequence of disjointed views spaced along the border. For example, a scroll input could slide the displayed portion of the segmentation back and forth along the path of the segmentation. As another example, steps 240 and 220 could iterate as different portions of the same segmentation were displayed to the user. Similar approaches as were described above for selecting the frame in the first place (e.g., based on an estimate of which frames contained errors) could be used to focus the user on specific portions of the segmentation to queue up this process (e.g., based on an estimate of which portions of the segmentation contained errors). As mentioned, both estimates can be provided by a separate system used to provide a baseline segmentation.

Flow chart 200 branches after step 220 as a user is provided with the option to accept a segmentation if it appears correct or skip the selected frame if it appears to be, or has proven to be, too difficult to manually correct. The user can skip a frame or accept a segmentation in step 230 by providing a frame skip input. The frame skip input can be provided via a dedicated gesture using an interface device, such as a leftward swipe on a touch screen, or by selecting a prompt presented on the interface, such as a button with the words "skip frame." In response to receiving the frame skip input, the system can loop back to step 201 to select another frame.

Alternatively, the user can provide a correction input in step 240. Providing a correction input can cause the user guided iterative segmentation process to continue to iterate on a given frame. The option to skip a frame can be provided regardless of the number of iterations of the segmentation process have been conducted. In specific embodiments of the invention, the system can be designed to discard the training process that occurred between the first receipt of a correction input and the entry of a skip command in order to revert the network to the state it was in before the training process occurred. As such, the user guided iterative training can avoid convergence of the network to undesirable states. This aspect of the flow chart also allows a user to avoid frustration by giving them the ability to skip frames where the network is not quickly converging to a desired result. As will be described in detail below, step 230 can also be triggered automatically if it is determined that the number of iterations has exceeded a limit proportional to a statistical variation of the frames in a scene. The limit can be referred to herein as an overtraining exclusion threshold. This limit can be determined through a statistical analysis of the scene as described below, and is directly proportional to the statistical variation within the scene, or a subset of the scene, that the network will be applied to segment.

Step 240 involves receiving a correction input from a user. The correction input can be directed to the segmentation. The correction input can be directed to the frame. The correction input can be an input used to adjust the segmentation or to tag a portion of the segmentation as an error. A user can be prompted to provide a correction input that specifically identifies ground truth in the original frame (i.e., "Tap Foreground Excluded from Segmentation"), so that the correction input can be associated with a tag matching the prompt. However, regardless of which type of correction input is provided by the user, the appropriate tag can be determined by the system. In effect, the step of receiving a correction input 240 can allow the system to obtain ground truth data for conducting a supervised learning routine for the network even if the user is not intending to identify ground truth with their inputs and is instead attempting to "clean up" or otherwise edit the segmentation. In specific embodiments, the tag will be assigned to the portion of the frame to which the correction input was directed and will be a tag for the ground truth content of that portion. For example, a user may provide a tap or click on an erroneous boundary region of the segmentation to "snap" the segmentation towards the true boundary. Such an input could otherwise be used to manually clean up an automated segmentation as opposed to identifying portions of the segmentation as erroneous. However, in so doing, the system can serve to clean up the segmentation and at the same time tag the region lying between the boundary before and after the snap as ground truth background.

The iterative user guided segmentation process can harvest inputs from the user to serve as, or generate, training data for improving the segmentation. Furthermore, this process can be conducted without the user even knowing that the inputs are being provided to train a segmentation network. Instead, the segmentation editor can intuit a ground truth tag based on standard inputs that are used in traditional tools to clean up a segmentation. In specific embodiments, a volume of correction inputs of this kind as harvested from a database of skilled editors correcting segmentations can be applied to initially train the segmentation network 211 prior to the execution of flow chart 200.

The correction input can take on numerous forms and be entered in various ways. Specific examples of the execution of step 240 are provided below in FIG. 5. Traditional tools for rotoscoping or otherwise adjusting a segmentation can be applied to enter the correction inputs. Furthermore, in specific embodiments, the correction inputs can be coarse inputs rapidly provided by a user using single gestures. For example, the gestures could be taps on a touch screen, rough path traces using a digital pen, or click and drag entries using a mouse. As illustrated, a user provides a coarse path trace 241 on tablet 222 using a touch and drag input on a touch display.

Flow chart 200 continues with a step 250 of training the segmentation network using the correction input. The way this step is executed depends on the nature of the segmentation network and the nature of the correction input. However, in specific embodiments of the invention, the correction input will be used as a tagged example of ground truth data in a training routine that adjusts the weights of the segmentation network using a process such as back propagation. The correction input can be modified by a trainer into a different format 251 before being applied to the segmentation network 211. In specific embodiments of the invention, training the segmentation network using a correction input can include tagging a portion of the frame identified by a correction input with a tag for the segmentation target and using the portion of the frame and the tag as a supervisor in a training routine for the segmentation network. For example, if a prompt were displayed to the user to inform them that they should identify a portion of the background that has been inappropriately segmented as part of the subject, the identified portion of the frame could be tagged with a segmentation target of "background" (i.e., the appropriate segmentation for the frame would have this portion as part of the background). That portion of the frame and the tag "background" could then be used as a supervisor in a training routine that would penalize network states that did not label that portion of the frame as part of the background.

The correction input can also be used to generate training data for the network, to modify the training procedure for the network, or be combined with various other items of data to be used as a more complex training data set for the network. In specific embodiments, a correction input will be used to quickly generate a large volume of synthetic training data to train the network using processes described in U.S. patent application Ser. No. 16/411,657 and U.S. patent application Ser. No. 16/412,183. In specific embodiments, the correction input will be used as an input to the network as part of a supervisor for a supervised training routine using processes described in U.S. patent application Ser. No. 16/411,657. In specific embodiments, the correction input will be used to focus a loss function of the training routine on specific sectors of the frame such as described in U.S. patent application Ser. No. 16/412,079.

After the segmentation network is retrained, the process can iterate by applying the frame to the network again. This involves another iteration of step 210 in which a revised frame segmentation is generated using the frame and the segmentation network. This iteration generates a revised frame segmentation because the segmentation network has been modified via the training process in step 250. The generated segmentation will likely be an improved segmentation in this iteration as the network has been specifically trained to not make at least one error associated with the prior iteration. The revised segmentation can be displayed along with the frame in another iteration of step 220. As before, the revised frame segmentation can be displayed overlaid over the frame. If the segmentation is acceptable, the user can accept the segmentation via step 230. In that case, the network may be applied to a second frame in the scene, such that the method loops back through step 201. In specific embodiments of the invention, after the segmentation is determined to be acceptable, the segmentation network can be applied to all the frames in the scene before step 201 is conducted again. Also, in specific embodiments, the segmentation editor itself will determine that the segmentation is acceptable, or that a maximum number of iterations have elapsed before applying the network to other frames in the scene or selecting another frame. The maximum number may be set by a predetermined overtraining threshold as described below.

Steps 210, 220, 240, and 250 can be iterated until network 211 is over trained for frame 202. Specifically, the network 211 can be trained until it is no longer generalizable to segment the subject from an arbitrary scene. However, as will be described below, the network can still be used to segment multiple frames from a given scene. In particular, the network can still be used to segment multiple frames from a given scene so long as a statistical variation of images in the scene is below an overtraining exclusion threshold. The overtraining exclusion threshold relates to the number of allowed iterations through steps 210, 220, 240, and 250 for a given frame from the scene. The number of allowed iterations can be set after an initial analysis of the scene, or subset of frames in the scene, to which the network will be applied after training. However, if a user continues to loop through iterations of these steps after the overtraining exclusion threshold has become too small to support the statistical variation of a given scene, the system can automatically add further scene breaks to the scene to decrease this statistical variation of the frames to which the network will be applied while allowing a user to improve the segmentation of a given frame.

Steps 210, 220, 240 and 250 (and optionally steps 230 and 201), can be iterated until network 211 is over trained for scene 203. In this case, the network can still be applied to segment all the frames in the scene but can't be generalized to other scenes. Accordingly, the state of the network can be saved and stored in association with the scene in question for later use. If edits are later made to the scene, the network can be recalled form memory to segment the revised scene. If needed, the recalled network can be quickly over trained on the revised scene using another set of iterations of steps 210, 220, 240, and 250 with the frames in a new iteration of step 201 now selected from the revised scene. In each iteration, the display step can involve displaying a more and more focused view of the segmentation in order to allow the user to provide an increasing degree of refinement to the segmentation with the same degree of effort. For example, the zoom level of the displayed frame can change in each iteration while the center of the display remains focused on a border of the segmentation.

FIG. 2 illustrates a block diagram of a device 270 that can be used to assist a user in executing some of the methods illustrated by flow chart 200. In particular, device 270 can serve as the interface for displaying the segmentation to the user and receiving the correction input. Device 270 can also provide a network connection to a server that conducts steps 210 and 250, or can include a local processing system for conducting those steps. Device 270 can be a tablet, workstation, laptop, or any other computing device. However, benefits accrue to approaches in which the device is a tablet for use on set by a director or visual effects supervisor, or a workstation utilized by a post-processing specialist.

Device 270 includes a display 271. In the illustrated case, the display 271 is a touch display that can both display the frame, display the scene to allow selection of the frame, and receive a correction input in the form of a touch command entered on the display. The touch interface can be formed over the display. Device 270 includes a locally instantiated frame selector 272 which is programmed to select a frame from a scene. In specific embodiments of the invention, the frame selector will be instantiated remotely at a server.

Device 270 also includes a segmentation editor 273 instantiated on the device. The segmentation editor is programmed to, in response to the frame selector 272 selecting an image, display on display 271 the frame and a frame segmentation overlaid on the frame. The segmentation editor also provides all the functionality to review and alter the appearance of the segmentation as described above with reference to step 220. Device 270 also includes a correction interface 275 configured to receive a correction input directed to the frame. The correction interface is illustrated in FIG. 2 using solid lines with reference to the fact that the correction interface is partially analog and partially digital in that it both appears on the physical display and is a software and hardware module capable of receiving inputs from a user for use by the computerized system. As such, it is accurate to say that the correction interface 275 is both configured to receive the correction input and programmed to receive the correction input.

Device 270 also includes a non-transitory computer readable medium for executing various steps in flow chart 200. In specific embodiments, the non-transitory computer readable medium for executing the steps of flow chart 200 can be partially on device 270 and partially on a remote server that is in networked communication with device 270. In FIG. 2, non-transitory computer readable medium 276 stores instructions to execute a method comprising providing the correction input to a trainer for a segmentation network, receiving a revised frame segmentation from the segmentation network after the trainer has applied the correction input to the segmentation network, and displaying the revised frame segmentation overlaid on the frame. The trainer can be instantiated on a server that is in networked communication with device 270. The trainer can be a supervised learning trainer with access to tagged data from device 270 as well as a network of similar devices, or a database of correction inputs provided via other devices.

The iterative process can involve retraining and recementing the frame automatically as a single response to the correction input to increase the speed of the iterative process. In specific embodiments, the loop through this process can execute on the order of milliseconds as a user enter basic coarse gestures on a touch screen such as taps on erroneous portions of a segmentation. In specific embodiments of the invention, the process can involve a full loop through training, generating a second segmentation of a frame, and displaying the second segmentation as a single response to a correction input. In specific embodiments of the invention, processes involving fast loops through the flow chart 200 can be combined with approaches in which the subject for segmentation is identified using a rough input on a frame before flow chart 200 commences. As such the user experience to begin the segmentation process for any arbitrary subject in the scene can match that of the portion of the process in which the network is refined to segment that subject.

Each iteration of the loops in FIG. 2 can include applying the segmentation network to a single frame, or multiple frames from the scene. In each iteration, the system can retrain the network to more accurately segment a single frame through a user guided process that trains the network on a single frame. In specific embodiments of the invention, the process can involve a loop through training, generating a second segmentation of a second frame, and displaying the second segmentation as a single response to a correction input. In each iteration, the system can cycle to a new frame from the scene in order to rapidly receive correction inputs spread across segmentation errors in the scene as a whole. In specific embodiments of the invention, the process can involve training, and then generating a segmentation for a set of frames in the scene as a single response to a correction input. The set of frames can define the scene. As such, the updated network can be applied to segment the entire scene automatically after a correction input has been received. In specific embodiments of the invention, a series of frames can be presented to the user and correction inputs can be received for the frames in sequence while the system is training on the inputs in the background, thereby starting the retraining process while the user is busy providing additional inputs. This approach is particularly beneficial to approaches in which the correction inputs are those commonly applied to manual rotoscoping tasks on a workstation which require the careful entry of commands in relation to the frame and segmentation.

Figure 3:
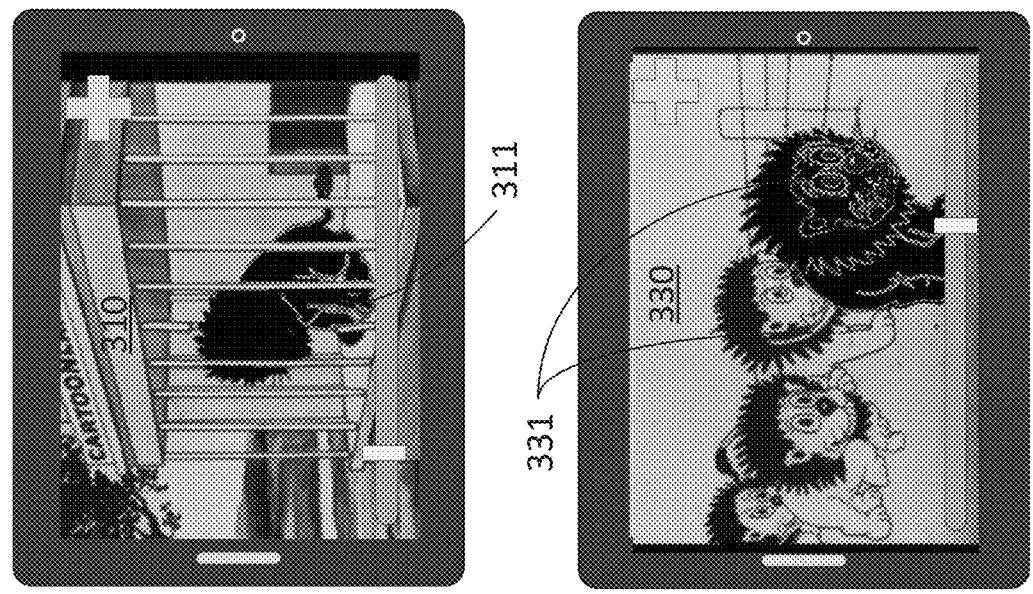
FIG. 3 is an illustration for a frame selector interface used to manually select a frame in accordance with specific embodiments of the invention disclosed herein.
Figure 3:
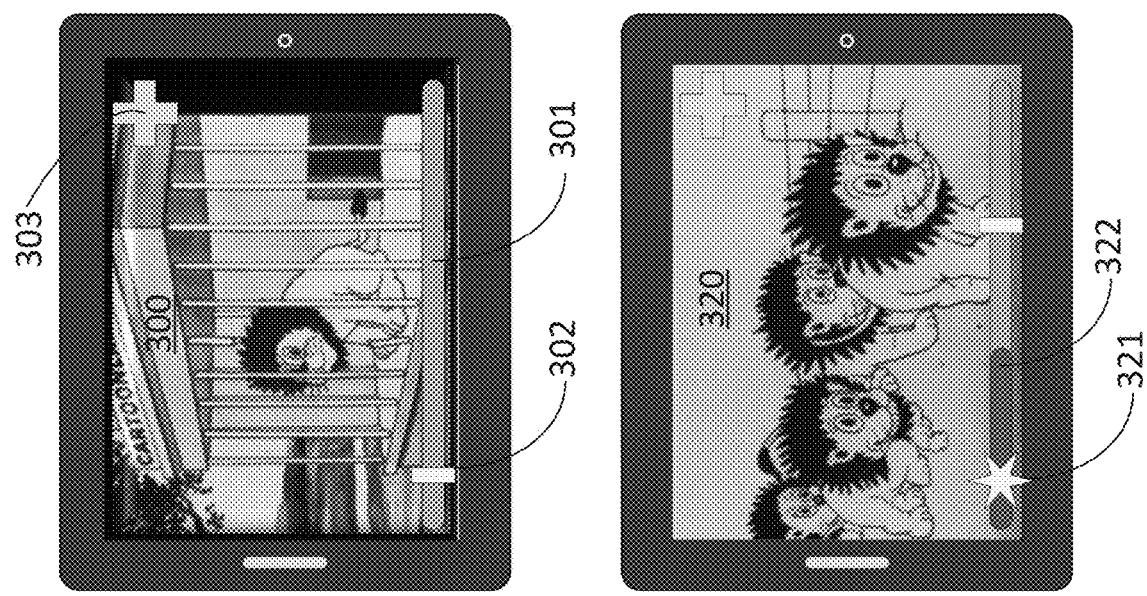

FIG. 3 is an illustration for a frame selector interface used to manually select a frame in accordance with specific embodiments of the invention disclosed herein. The frame selector interface can be used to execute step 201 from flow chart 200. FIG. 3 is directed to a manual frame selector in which a user can review a scene and manually select frames therefrom. The interface is shown in four states 300, 310, 320, and 330. In each case, the interface is shown in a tablet device with a touch screen interface. However, the same interface could be adapted for use with any computing device. The illustrated frame selector interfaces allow a user to watch the scene with a standard scrolling playback interface 301 which includes a pause/play interface 302 which can be used to scrub back and forth and control playback through the scene. The illustrated frame selectors interfaces also include a frame selection interface 303 which allows a user to select the currently presented frame for use in the next steps of flow chart 200.

The frame selector interface can provide the user with guides to assist in the selection of one or more frames. As illustrated, the scrolling playback interface 301 can include selected frame markers 321 to indicate where selections have been made. In this case, frame marker 321 shows the user that the frame displayed in state 300 has been selected. Also illustrated in state 320 is a scene subset marker 322. The scene subset marker 322 can indicate a subset of frames in the scene which an automated system has determined to have a statistical variation below an overtraining threshold. As such, the user is prompted by scene subset marker 322 to select at least one frame from that portion of the scene. The appearance of the subset marker can change before and after a selection of a frame has been made therein. A given scene represented by an interface such as playback interface 301 can be divided into any number of subsets each with its own scene subset marker. Alternatively, or in combination, indicators like scene subset marker 322 can show a user how large of a subset of frames from the scene have a variation within that threshold after the user has selected the frame. For example, after selecting the frame shown in state 302, the scene subset marker 322 can appear on the scrolling playback interface 301 to show how large of a subset of frames share are within a given level of statistical variation from the selected frame. The level of statistical variation can be proportional to an overtraining exclusion threshold. In these embodiments, the system can conduct the statistical analysis of the scene after the user has selected the frame.

As stated previously, a manual frame selector can additionally involve a review of a previously executed segmentation. State 310 illustrates how segmentation 311 can be displayed overlaid on the frame to allow a user to review frames where the segmentation has failed. The user can then select frames to correct based on this review by selecting frame selection interface 303 when a failed segmentation is visually determined. In the illustrated case, a user may have determined that the segmentation in state 310 is sufficient and therefore that frame does not need to be selected. However, upon review of state 330, the user may see portions 331 where the segmentation has failed and select the displayed frame for the remainder of flow chart 200 in order to improve the performance of the network via the entry of correction inputs on the frame displayed in state 330.

Figure 4:
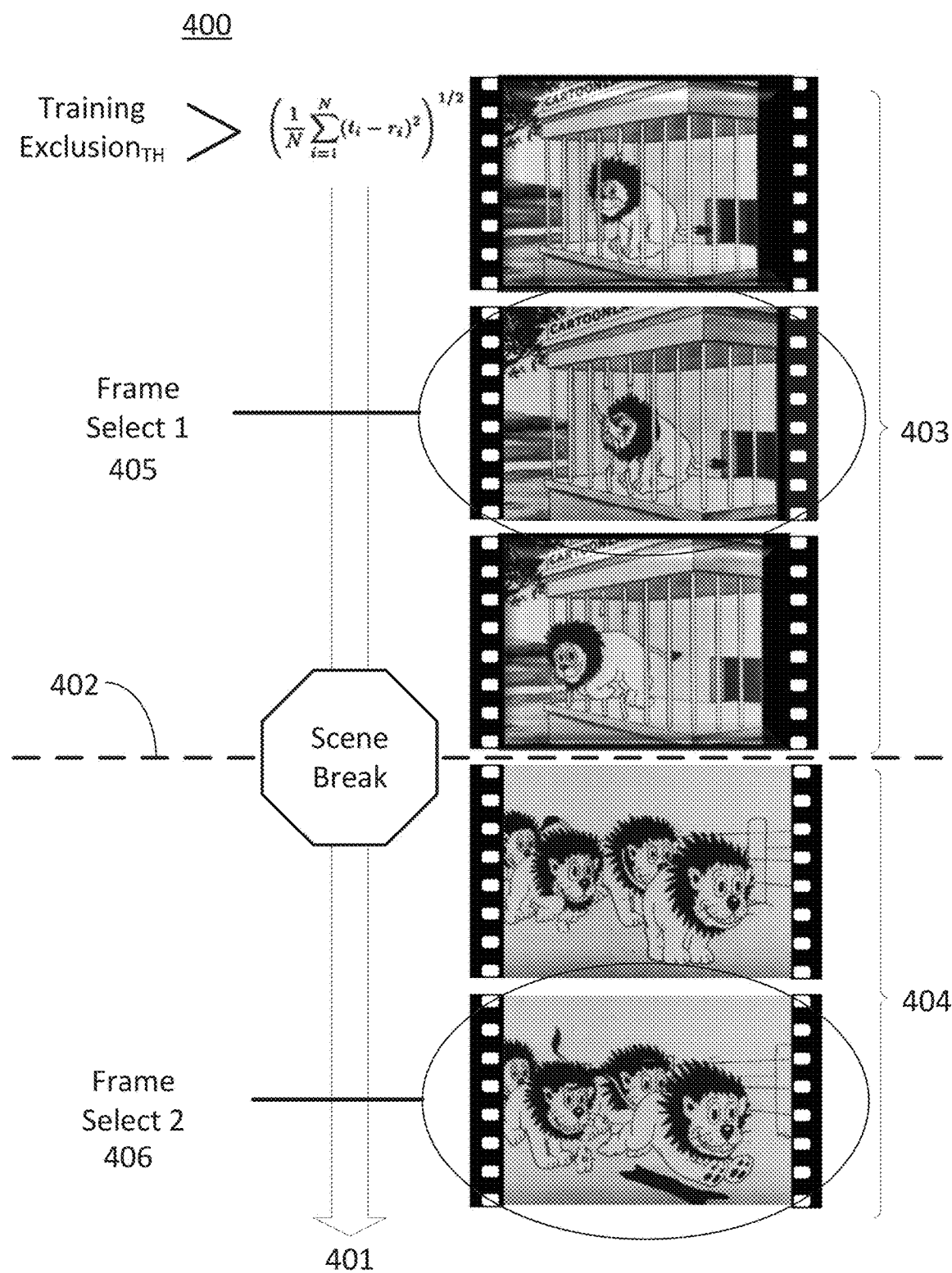
FIG. 4 is an illustration for how a frame selector can automatically select frames from a scene using a statistical analysis of the frames in the scene in accordance with specific embodiments of the invention disclosed herein.

FIG. 4 is an illustration of a process 400 for how a frame selector can automatically select frames from a scene using a statistical analysis of the frames in the scene in accordance with specific embodiments of the invention disclosed herein. Process 400 includes conducting a scan 401 of the scene for a set of statistical variation points using a frame selector. As illustrated the scan calculates a normalized difference between the values of the elementary elements of a first frame "t" and the values of the elementary elements of a second frame "r." The statistical variation points can be characterized by rapid or instantaneous changes in the visual appearance of the frames such as by scene break 402. The scene break can divide the scene into two subsets of frames 403 and 404 where the statistical variation between frames is below a predefined threshold. The predefined threshold can be set by, and be proportional to, an overtraining exclusion threshold. As such, the scanning process will determine how many frames can be segmented accurately given the amount of overtraining that will be allowed on a given frame. The statistical variation points can be selected based on the variation exceeding the predefined threshold. After statistical variation points such as scene break 402 are detected, the process can further involve breaking the scene into subsets of frames, such as subsets 403 and 404, and then selecting specific frames from those subsets.

Scan 401 can involve any form of statistical analysis conducted on the frames. The scan can involve calculating a normalized delta between the values of the elementary component frames (e.g., the numerical difference between corresponding pixels values in two dimensional pixelated frames). The scan can involve calculating a feature vector for each frame (e.g., a histogram or edge counter) and evaluating a difference between the feature vectors instead of the raw pixel values. The scan can involve calculating the cross correlation of frames. The scan can compare consecutive frames. However, the scan does not have to focus on consecutive frames and can instead skip frames and conduct a moving average or add some other form of hysteresis in the variation analysis to avoid false positives.

After the set of statistical variation points are identified by the frame selector, selecting the frames can involve selecting frames located between two statistical variation points in the set of statistical variation points. The two steps of this process (identifying the variation points and selecting the frames) can both be automated. Accordingly, and automated frame selector can automatically scans the scene and selects frames 405 and 406. The frames can be selected based on a search for the most representative frame in the subset (e.g., a frame having the lowest mean squared delta between all of the frames in the subset). However, the process can also involve manual inputs. For example, the statistical variation points could be automatically identified and be used to guide a user to select frames located between the statistical variation points. For example, the scan can be used to generate scene subset markers like 322 in FIG. 3 to inform the user that they are required to select a frame from a given subset of frames.

Figure 5:
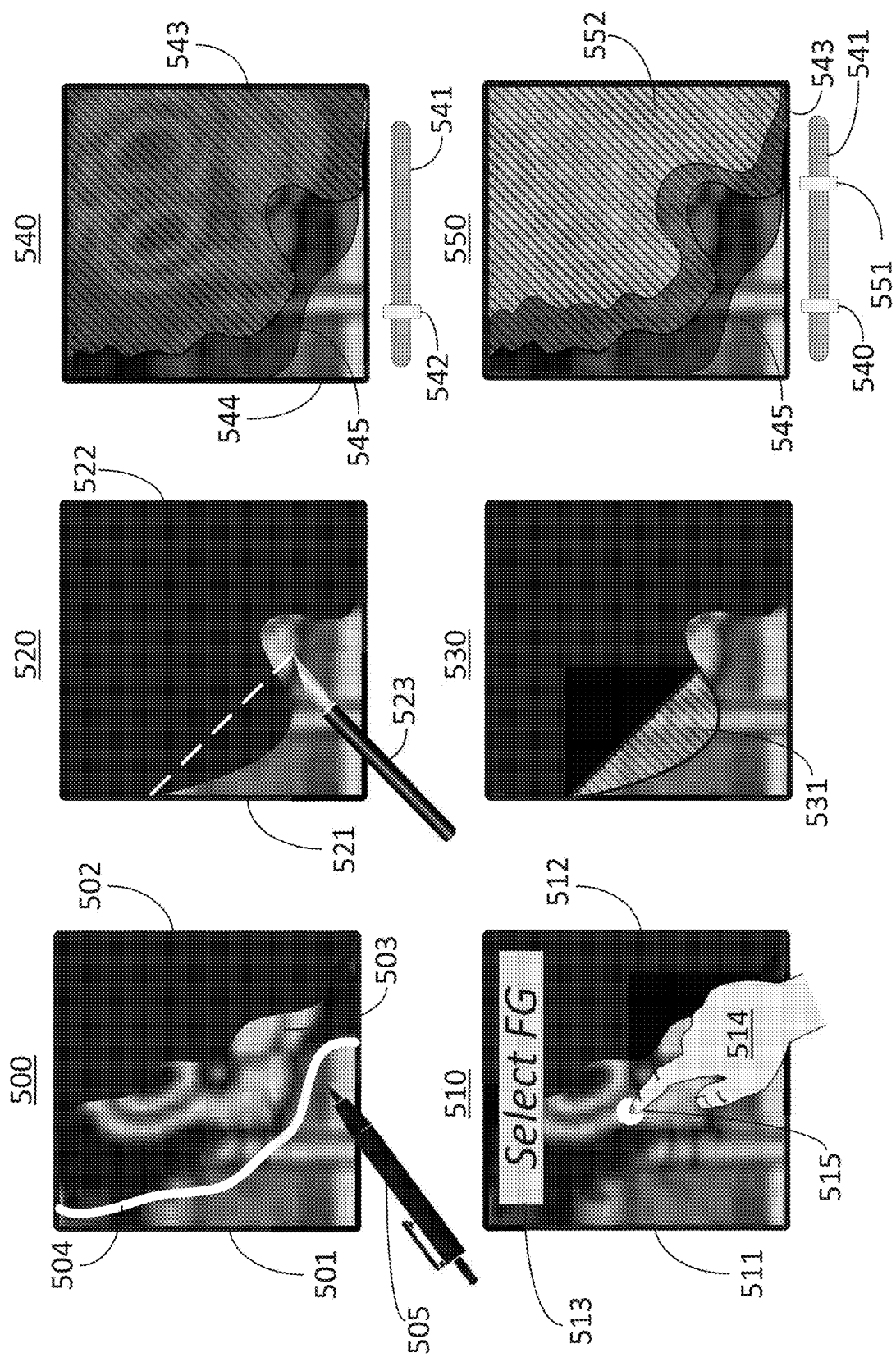
FIG. 5 provides an illustration of several correction input interfaces configured to receive a correction input in accordance with specific embodiments of the invention disclosed herein.

FIG. 5 provides examples of how the system can receive correction inputs from a user. As stated above, some of the specific methods disclosed for receiving correction inputs from a user disclosed herein are applicable to segmentation tools generally as they can be applied to touch up any segmentation and are not limited to use with a user-guided iterative segmentation process. At the same time, these inputs will be analyzed and used in a training procedure to refine the network used to generate the segmentation. However, some of the specific methods disclosed for receiving correction inputs are specifically directed to harvesting training data from the user for training the network to better segment a given frame and can involve a prompt to select specific portions of the image or segmentation to do so. The correction inputs can be basic inputs to facilitate ease of use. For example, the correction input can be a single gesture received on a touch screen interface such as a tap or coarse trace of a segmentation boundary. The correction inputs disclosed herein can also be the correction inputs disclosed in U.S. patent application Ser. No. 16/411,657.

The correction input can be directed to the frame and can involve a visual inspection of the segmentation overlaid on the frame. For example, view 500 shows frame 501 with segmentation 502 overlaid thereon. In view 500, the segmentation has partially failed, and a portion associated with the subject 503 has not been segmented. However, a user can quickly inspect the frame, recognize the failure of segmentation 502 as compared to ground truth, and provide a correction input. In view 500, the correction input is a coarse trace of a segmentation boundary 504 entered using a digital pen 505. A user may be able to edit the thickness of the trace. For example, by using a middle mouse wheel. Segmentation boundary 504 can be used to clean up the segmentation as the segmentation editor can be programmed to expand out the segmentation and snap it to boundary 504. However, the same input can be used to harvest data for training the network. In the illustrated case, the system can be programmed to recognize that the portion of frame 501 between boundary 504 and segmentation 502 should have been segmented and can take that information as ground truth for retraining the network. In specific embodiments of the invention, the system will not label all of the frame between boundary 504 and segmentation 502 as ground truth since the input could be a coarse input and instead the labeling of ground truth could use a weighting factor to increase confidence in the labeling based on a distance from the coarse input and a distance to the boundary of failed segmentation 502. Although a digital pen was used in the case, a boundary region can be defined using any other type of user interface known in the art for drawing lines in graphics editors such as a touch input, pen tool, curve tool, free hand click-and-drag tool, etc.

The ability to snap a boundary outward or inward when providing a correction input can be implemented in various ways. The system used to snap the boundary can itself be a network. In addition to drawing a line, a user could be able to click or tap at regions towards which the boundary should snap (either inward or outward). In addition to drawing a line, a user could also be able to click and slide on the boundary to push or pull it towards a boundary. The segmentation could be translucent in order to allow the user to provide inputs that snap the boundary inward.

View 510 provides an example of a correction input that is specifically designed to harvest training data for the network. View 510 again includes a frame 511 with a failed segmentation 512 overlaid thereon. However, in this case, receiving the correction input includes displaying a prompt 513 to select a segmentation target. In this case, the segmentation target is the "FG" for foreground (referring to the subject). However, the segmentation target could also have been the background. In the illustrated case, the segmentation is opaque such that telling the user to select foreground presupposes that the user should select foreground which is outside the segmented area. However, prompts could be used to inform the user to select any segmentation target regardless of whether it was segmented. For example, the prompt could tell the user to identify regions that were labeled background but should not have been, areas of the background generally, areas where the background was properly identified, regions that were labeled foreground but should not have been, areas of the foreground generally, and areas where the foreground was properly identified. Regardless, a user correction input such as tap 515 provided by touch input 514 in response to the prompt will identify a portion of the image that should be tagged with the segmentation target indicated by prompt 513. The resulting tagged data can then be used to retrain the network in any manner. The input provided in response to the prompt does not need to be a tap and can instead be a scribble, click and drag polygon, a boundary such as boundary 504, or any other type of input required to obtain ground truth data from the user.

Views 520 and 530 illustrate a slicing tool for providing correction inputs in accordance with specific embodiments of the invention. The slicing tool can be used to provide correction inputs for some of the methods described with reference to flow chart 200. However, the slicing tool can also be used to clean up a segmentation generally. View 520 shows frame 521 with failed segmentation 522 laid thereon. As seen, the segmentation is overinclusive. As such, the user can provide a slice input 523 to cut off a piece of the segmentation. The input can involve a swipe using a mouse, digital pen, or touch swipe to define slice input 523. The slice input can be accompanied by another input to identify in which direction the slice is meant to affect the segmentation. For example, holding the left mouse button could act to cut a portion of the segmentation back and decrease the size of the area associated with the subject. while holding the right mouse button could act to grow a portion of the segmentation and increase the size of the area associated with the subject. Conceptually, the two modes for the slicing tool would be slicing the segmentation or slicing the background. The segmentation editor could also include two different tools for slicing in either direction. The slicing tool could also be designed to automatically follow the morphology of the failed segmentation such that a slice served to either dilate or erode the border of the failed segmentation. The degree to which the border dilated or eroded could be set by the position of the slice input relative to the border or a thickness input specified by the user. As with the other correction inputs described herein, the system can harvest ground truth data from the slice input. As shown in view 530, the system can label data associated with portion 531 as background and utilize the data for training the network. As with the other inputs, the system can be designed to hedge its reliance on the accuracy of the input by labeling data in the portion with a weighting function that provided more weight to the outermost regions of the slice.

Views 540 and 550 illustrate a morphology erosion and dilation tool for providing correction inputs in accordance with this disclosure. The erosion and dilation tool can be used to expand or contract a segmentation while keeping the morphology of the original failed segmentation. These correction inputs apply across the entire segmentation with a level of precision that would be difficult to match with a freehand input while at the same time only requiring one or two basic inputs from the user that can be specified as accurately as by specifying a number using a keyboard. The input can be the magnitude of erosion or dilation. For example, the input can be a numerical value for several elementary frame values that the segmentation should be expanded or contracted by. For example, a user could enter in a value of "10" and the segmentation would be dilated by 10 pixels.

Views 540 and 550 illustrate an implementation where the magnitude of erosion and dilation are defined by the user using a slider bar 541 in which a distance from the midpoint sets the value by which the segmentation was expanded or contracted. A user could watch as the boundary expanded out while a slider 542 on the slider bar was adjusted. As illustrated, original segmentation 543 on frame 544 could be dilated to an expanded boundary 545. The system can then label the portion of the image outside of boundary 545 as background for purposes of training the network. In specific embodiments of the invention, the user can also provide both a dilation input and an erosion input using a separate slider 551 on slider bar 541, or some other means of specifying a magnitude of erosion. The resulting eroded region 552 can then define a tri-map with the original segmentation 543 and the dilated region 545. The system can then tag the portion of the frame inside region 552 as foreground and the portion of the frame outside region 545 as background for purposes of training the network.

With reference back to step 220, an automated system can utilize a similar approach using a tri-map to define a portion of the segmentation to display to the user. The morphology of the segmentation can be traced by this automated system with a set pixel distance of dilation and erosion. The boundary could be dilated to form an outer boundary of the tri-map. The boundary could be eroded to form an inner boundary of the tri-map. The resulting tri-map can be used to guide how much of the original frame to display to the user during step 220. The system could then present a region of the frame for receiving a correction input using the tri-map. In effect, the automated system will use the tri-map to focus the user on an area of the frame where segmentation errors are most likely to have occurred while still displaying enough of the underlying frame to provide the opportunity to identify the correct border of the ground truth segmentation.

Figure 6:
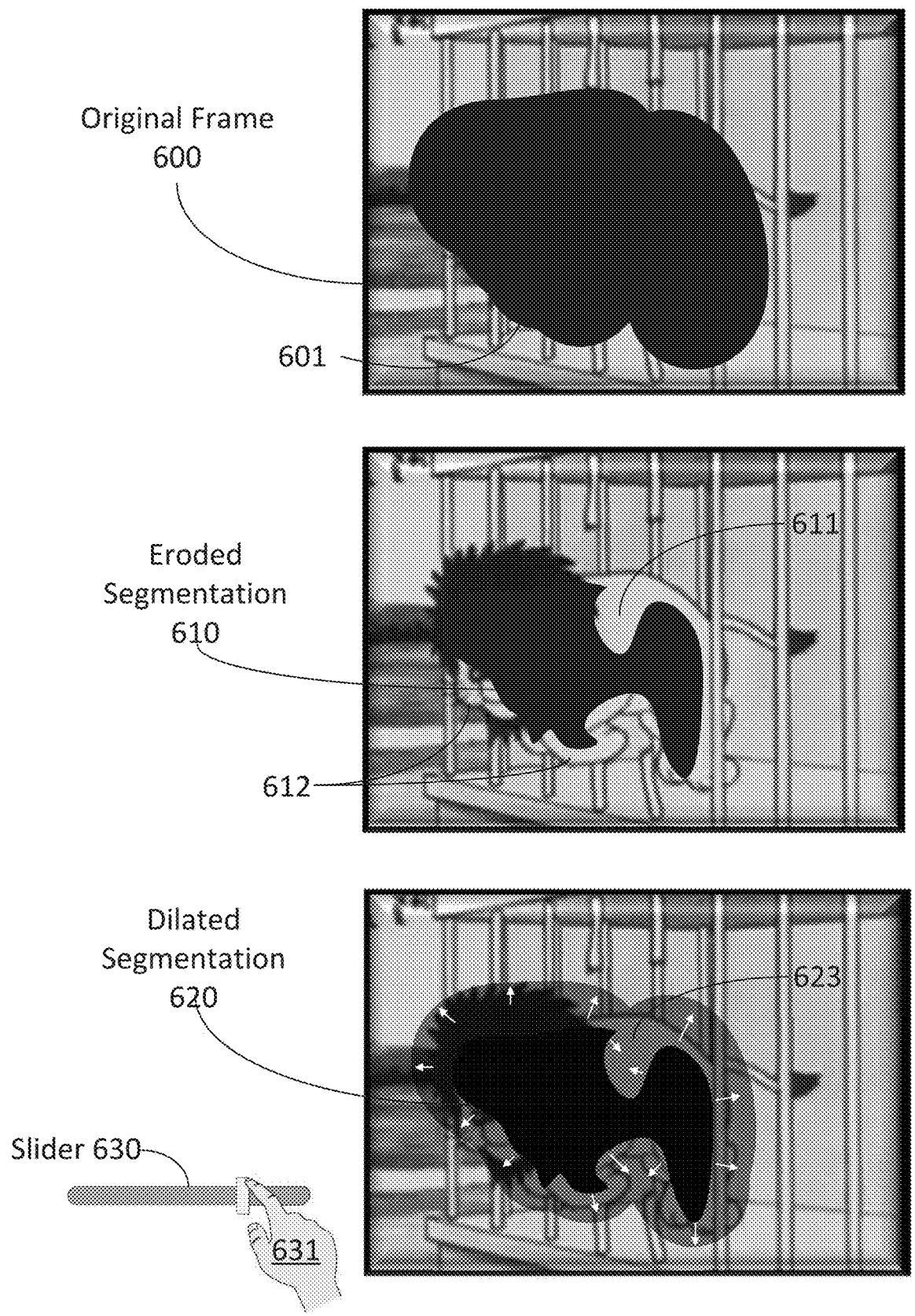
FIG. 6 provides an illustration of a correction input that defines a background given a foreground in accordance with specific embodiments of the invention disclosed herein.

FIG. 6 provides an illustration of a correction input that defines a background given a foreground in accordance with specific embodiments of the invention disclosed herein. In specific embodiments of the invention, given a segmentation, the background of the frame can be defined as a settable distance away from the border of the segmentation. The settable distance can be a correction input provided by a user during a visible inspection of the segmentation. The settable distance can also be defined using an automated process which evaluates texture information of the image or feature vectors thereof. In either case, a first process can act to shrink or dilate an original segmentation such that it is entirely within the foreground before it is subsequently expanded by said settable distance to define the background.

FIG. 6 includes an original frame 600 in which a subject has been segmented with an overinclusive segmentation 601. The user can then erode, shrink, or partially delete the segmentation so that it is entirely within the boundary of the subject, as in eroded segmentation 610. As illustrated, eroded segmentation 610 includes under inclusion errors in the form of border errors 612 and error holes 611. However, the system knows that all the material within dilated segmentation 610 should be tagged as foreground for training purposes. Accordingly, a user can be provided with the ability to confirm an eroded segmentation in order to provide this information to the system.

FIG. 6 also includes a dilated segmentation 620. As seen, the eroded segmentation 610 has been morphologically expanded. In so doing, dilated segmentation 620 now covers border errors 612 and error holes 611. The dilation and erosion of the segmentations can be done one elementary element at a time such as one pixel at a time. A simple button press or tap can control a step wise dilation or erosion. Either type of movement can also be controlled by a slider 630 controlled by a sliding touch input 631. Regardless, a user can confirm the appropriate eroded segmentation 610 size and dilated segmentation 620 size with a confirmation input. Upon doing so, the system can tag everything outside dilated segmentation 620 as background and everything within eroded segmentation 610 as foreground. These steps can be conducted regardless of whether eroded segmentation 610 is specified by the user from an overinclusive segmentation or if a segmentation with the shape of eroded segmentation 610 was automatically generated and then confirmed by a confirmation input. The tagged data generated through this process can then be used to train a segmentation network to more accurately segment the frame.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, additional data can be combined with the input to the segmentation network such as depth, lighting, and surface information. As another example, while the example of a two-dimensional scene was used throughout this disclosure, the disclosure is equally applicable to segment three dimensional frames where the elementary elements of the frame are three-dimensional voxels as opposed to pixels. Any of the method steps discussed above can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. A computer-implemented method comprising:
   selecting a frame from a scene;
   generating a first frame segmentation using: (i) the frame; and (ii) a segmentation network;
   displaying on a device: (i) the frame; and (ii) the first frame segmentation overlaid on the frame;
   receiving a correction input directed to the frame;
   training the segmentation network using the correction input;
   iterating through the generating segmentation step, displaying segmentation step, receiving correction input step, and training the segmentation step until a number of iterations reaches a predetermined threshold, the predetermined threshold being determined based on a statistical variation within the scene;
   generating, after training the segmentation network using the correction input, a revised frame segmentation using: (i) the frame; and (ii) the segmentation network; and
   displaying on the device: (i) the frame; and (ii) the revised frame segmentation overlaid on the frame.

2. The computer-implemented method of claim 1, further comprising:
   scanning the scene for a set of statistical variation points using a frame selector,
   wherein the selecting the frame step is conducted: (i) using the set of statistical variation points; and (ii) so that the frame is from a frame located between two statistical variation points in the set of statistical variation points.

3. The computer-implemented method of claim 1, further comprising:
   dilating the first frame segmentation to form an outer boundary of a tri-map;
   eroding the first frame segmentation to form an inner boundary of the tri-map; and
   presenting a region of the frame for receiving the correction input using the tri-map.

4. The computer-implemented method of claim 1, wherein:
   training the segmentation network using the correction input includes tagging a portion of the frame identified by the correction input with a tag for the segmentation target; and
   the portion of the frame and the tag are used as a supervisor in a training routine for the segmentation network.

5. The computer-implemented method of claim 1, further comprising:
   selecting a second frame from the scene;
   generating a second frame segmentation using: (i) the second frame; and (ii) the segmentation network;
   displaying on the device: (i) the second frame; and (ii) the second frame segmentation overlain on the second frame;
   receiving a frame skip input; and
   selecting a third frame from the scene, wherein the selecting the third frame step is conducted as a response to the receiving the frame skip input.

6. The computer-implemented method of claim 1, further comprising:
   displaying a prompt to select a segmentation target, wherein the correction input is provided in response to the prompt, wherein training the segmentation using the correction input includes tagging a portion of the frame identified by the correction input with a tag for the segmentation target, and wherein the portion of the frame and the tag are used as a supervisor in a training routine for the segmentation network.

7. A computer-implemented method comprising:
   selecting a frame from a scene;
   generating a first frame segmentation using: (i) the frame; and (ii) a segmentation network;
   displaying on a device: (i) the frame; and (ii) the first frame segmentation overlaid on the frame;
   receiving a correction input on the frame;
   training the segmentation network using the correction input; and
   training the segmentation network for the scene by iterating the selecting, generating, displaying, receiving, and training steps using one of: the same frame; or a series of frames from the scene, wherein the training step, the generating the revised frame segmentation step, and the displaying the frame and revised frame segmentation step are all conducted as a single response to the receiving the correction input step until a number of iterations reaches a predetermined threshold, the predetermined threshold being determined based on a statistical variation within the scene.

8. The computer-implemented method of claim 7, further comprising:
generating, after training the segmentation network using the correction input, a second frame segmentation using: (i) a second frame; and (ii) the segmentation network, wherein the second frame is from the scene, and wherein the generating the second frame segmentation step is conducted as part of the single response.

9. The computer-implemented method of claim 7, further comprising:
displaying a prompt to select a segmentation target, wherein the correction input is provided in response to the prompt, wherein training the segmentation using the correction input includes tagging a portion of the frame identified by the correction input with a tag for the segmentation target, and wherein the portion of the frame and the tag are used as a supervisor in a training routine for the segmentation network.

10. A computer-implemented method comprising:
selecting a frame from a scene;
scanning the scene for a set of statistical variation points, wherein the selecting the frame step is conducted: (i) using the set of statistical variation points; and (ii) so that the frame is from a frame located between two statistical variation points in the set of statistical variation points;
generating a first frame segmentation using: (i) the frame; and (ii) a segmentation network;
displaying on a device: (i) the frame; and (ii) the first frame segmentation overlaid on the frame;
receiving a correction input on the frame;
training the segmentation network using the correction input; and
training the segmentation network for the scene by iterating the selecting, generating, displaying, receiving, and training steps using one of: the same frame; or a series of frames from the scene.

11. A computer-implemented method comprising:
selecting a frame from a scene;
generating a first frame segmentation using: (i) the frame; and (ii) a segmentation network;
displaying on a device: (i) the frame; and (ii) the first frame segmentation overlaid on the frame;
receiving a correction input on the frame;
training the segmentation network using the correction input;
training the segmentation network for the scene by iterating the selecting, generating, displaying, receiving, and training steps using one of: the same frame; or a series of frames from the scene;
dilating the first frame segmentation to form an outer boundary of a tri-map;
eroding the first frame segmentation to form an inner boundary of the tri-map; and
presenting a region of the frame for receiving the correction input using the tri-map.

12. A computer-implemented method comprising:
selecting a frame from a scene;
generating a first frame segmentation using: (i) the frame; and (ii) a segmentation network;
displaying on a device: (i) the frame; and (ii) the first frame segmentation overlaid on the frame;
receiving a correction input on the frame;
training the segmentation network using the correction input;
training the segmentation network for the scene by iterating the selecting, generating, displaying, receiving, and training steps using one of: the same frame; or a series of frames from the scene; and
receiving a frame skip input instead of an additional correction input during an iteration of the training the segmentation network for the scene step, wherein the training the segmentation network using the correction input step is skipped during the iteration.

13. A device comprising:
a display;
a frame selector instantiated on the device, wherein the frame selector is programmed to select a frame from a scene;
a segmentation editor instantiated on the device, wherein the segmentation editor is programmed to, in response to the frame selector selecting the frame, display on the display: (i) the frame; and (ii) a frame segmentation overlaid on the frame;
a correction interface configured to receive a correction input directed to the frame;
wherein the device is programmed to:
provide the correction input to a trainer for a segmentation network;
receive a revised frame segmentation from the segmentation network after the trainer has applied the correction input to the segmentation network; and
display the revised frame segmentation overlaid on the frame; and
iterate through the receive the correction input, and training the corrected input until a number of iterations reaches a predetermined threshold, the predetermined threshold being determined based on a statistical variation within the scene.

14. The device of claim 13, wherein the frame selector is programmed to:
scan the scene for a set of statistical variation points, wherein the selecting the frame step is conducted: (i) using the set of statistical variation points; and (ii) so that the frame is from a frame located between two statistical variation points in the set of statistical variation points.

15. The device of claim 13, wherein:
the correction interface includes a prompt to select a segmentation target;
the correction input is provided in response to the prompt;
the trainer is a supervised learning trainer; and
a portion of the frame identified by the correction input and a segmentation target type form a supervisor for the trainer.

16. A non-transitory computer-readable medium comprising executable instructions, the executable instructions being executable by one or more processors to perform a method, the method comprising:
selecting a frame from a scene;
generating a first frame segmentation using: (i) the frame; and (ii) a segmentation network;
displaying on a device: (i) the frame; and (ii) the first frame segmentation overlaid on the frame;
receiving a correction input directed to the frame;
training the segmentation network using the correction input;

iterating through the generating segmentation step, displaying segmentation step, receiving correction input step, and training the segmentation step until a number of iterations reaches a predetermined threshold, the predetermined threshold being determined based on a statistical variation within the scene;

generating, after training the segmentation network using the correction input, a revised frame segmentation using: (i) the frame; and (ii) the segmentation network; and displaying on the device: (i) the frame; and (ii) the revised frame segmentation overlaid on the frame.

17. The non-transitory computer-readable medium of claim 16, the executable instructions that are executable by the one or more processors to further:

scanning the scene for a set of statistical variation points using a frame selector, wherein the selecting the frame step is conducted: (i) using the set of statistical variation points; and (ii) so that the frame is from a frame located between two statistical variation points in the set of statistical variation points.

18. The non-transitory computer-readable medium of claim 16, the executable instructions that are executable by the one or more processors to further:

dilating the first frame segmentation to form an outer boundary of a tri-map;
eroding the first frame segmentation to form an inner boundary of the tri-map; and
presenting a region of the frame for receiving the correction input using the tri-map.

19. The non-transitory computer-readable medium of claim 16, the executable instructions that are executable by the one or more processors to further:

training the segmentation network using the correction input includes tagging a portion of the frame identified by the correction input with a tag for the segmentation target; and
the portion of the frame and the tag are used as a supervisor in a training routine for the segmentation network.

20. A non-transitory computer-readable medium comprising executable instructions, the executable instructions being executable by one or more processors to perform a method, the method comprising:

selecting a frame from a scene;
scanning the scene for a set of statistical variation points, wherein the selecting the frame step is conducted: (i) using the set of statistical variation points; and (ii) so that the frame is from a frame located between two statistical variation points in the set of statistical variation points;
generating a first frame segmentation using: (i) the frame; and (ii) a segmentation network;
displaying on a device: (i) the frame; and (ii) the first frame segmentation overlaid on the frame;
receiving a correction input on the frame;
training the segmentation network using the correction input; and
training the segmentation network for the scene by iterating the selecting, generating, displaying, receiving, and training steps using one of: the same frame; or a series of frames from the scene.

21. A non-transitory computer-readable medium comprising executable instructions, the executable instructions being executable by one or more processors to perform a method, the method comprising:

selecting a frame from a scene;
dilating the first frame segmentation to form an outer boundary of a tri-map;
eroding the first frame segmentation to form an inner boundary of the tri-map;
presenting a region of the frame for receiving the correction input using the tri-map;
generating a first frame segmentation using: (i) the frame; and (ii) a segmentation network;
displaying on a device: (i) the frame; and (ii) the first frame segmentation overlaid on the frame;
receiving a correction input on the frame;
training the segmentation network using the correction input; and
training the segmentation network for the scene by iterating the selecting, generating, displaying, receiving, and training steps using one of: the same frame; or a series of frames from the scene.

22. A non-transitory computer-readable medium comprising executable instructions, the executable instructions being executable by one or more processors to perform a method, the method comprising:

selecting a frame from a scene;
generating a first frame segmentation using: (i) the frame; and (ii) a segmentation network;
displaying on a device: (i) the frame; and (ii) the first frame segmentation overlaid on the frame;
receiving a correction input on the frame;
training the segmentation network using the correction input;
training the segmentation network for the scene by iterating the selecting, generating, displaying, receiving, and training steps using one of: the same frame; or a series of frames from the scene; and
receiving a frame skip input instead of an additional correction input during an iteration of the training the segmentation network for the scene step, wherein the training the segmentation network using the correction input step is skipped during the iteration.

* * * * *